United States Patent [19]

Ruchti

[11] 4,266,538
[45] May 12, 1981

[54] PRESSURE REGULATOR

[75] Inventor: Heinz Ruchti, Lenzburg, Switzerland

[73] Assignee: General Diving Corporation, Santa Fe Springs, Calif.

[21] Appl. No.: 33,731

[22] Filed: May 8, 1979

[51] Int. Cl.³ .................................................. A62B 7/04
[52] U.S. Cl. ................................. 128/204.26; 251/58; 137/494; 137/DIG. 9; 285/357
[58] Field of Search ..................... 128/204.26, 204.27, 128/205.24, 205.22, 202.22, 201.27.201.28; 137/505.47, 505.25, 508, 510, 494, DIG. 9; 151/27, 28; 285/357, 392; 251/232, 234, 58, 279, 245, 246

[56] References Cited

U.S. PATENT DOCUMENTS

| 1,372,876 | 3/1921 | Freund | 285/357 |
|---|---|---|---|
| 2,675,649 | 4/1954 | Trevaskis et al. | 137/505.25 |
| 3,437,109 | 4/1969 | Carlson et al. | 137/505.25 |
| 3,474,822 | 10/1969 | Kuhn et al. | 137/505.41 |
| 3,799,189 | 3/1974 | Christianson | 137/505.25 X |
| 4,181,139 | 1/1980 | Martini | 137/505.25 X |

FOREIGN PATENT DOCUMENTS

| 1355755 | 2/1964 | France | 128/204.26 |
|---|---|---|---|
| 744718 | 2/1956 | United Kingdom | 137/DIG. 9 |

Primary Examiner—Henry J. Recla
Attorney, Agent, or Firm—Jesus Sanchelima

[57] ABSTRACT

A regulator for underwater diving having an improved first stage wherein the bias of the coil spring is varied by changing the relative position of the piston seat which can be readily accessed. The second stage of the regulator is capable of satisfying the human breathing demand with the use of a linkage ratio adjustment feature which coupled with the selection of the proper angle for the housing of the diaphragm permits the amplification and faithful tracking of the diver's breathing cycle. Also, exhaust means has been provided to facilitate the purging of extraneous fluids from the regulator in the most common positions of the diver. The above mentioned features, in combination, will provide a perfect match of the first and second stages of the regulator.

3 Claims, 6 Drawing Figures

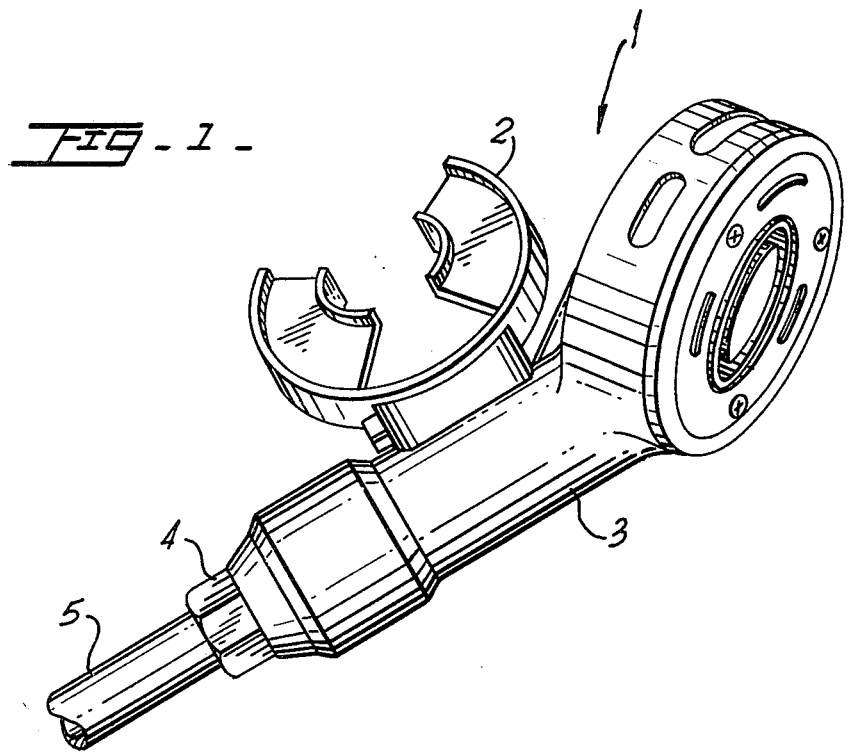
FIG-1-
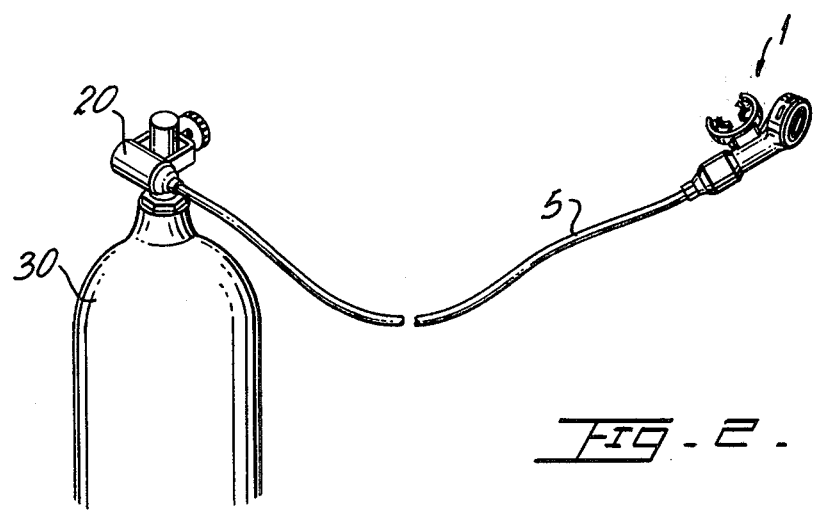
FIG-2-

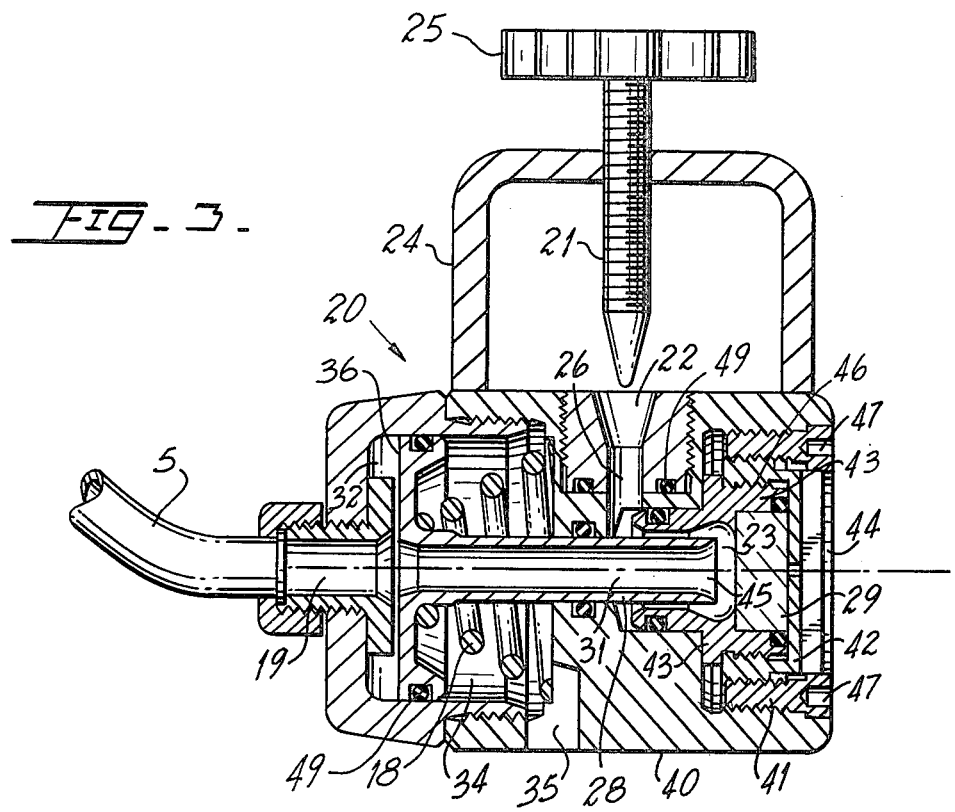
_FIG-3-_
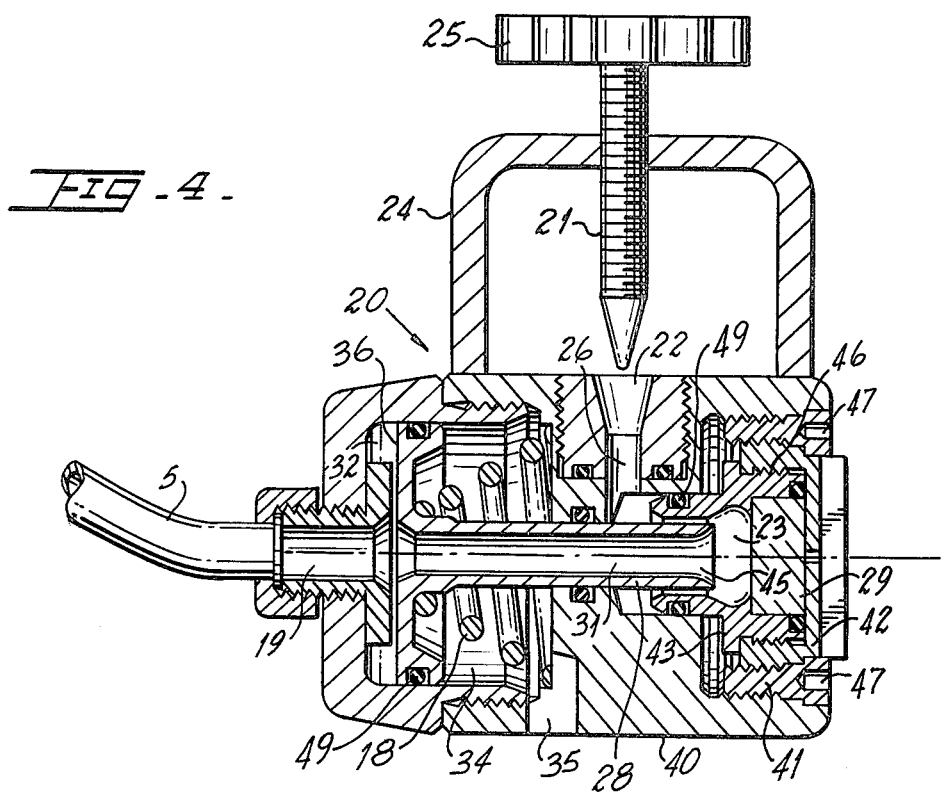
_FIG-4-_

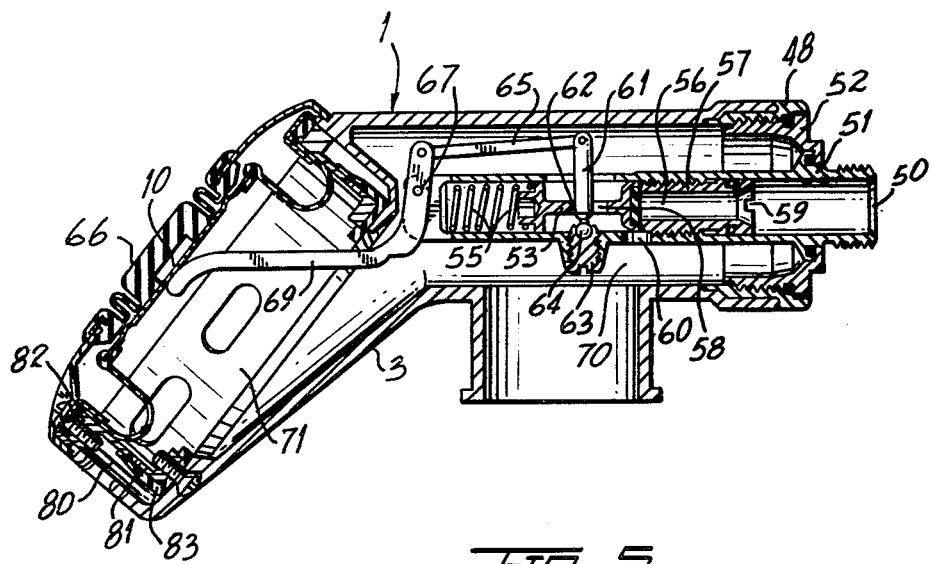
FIG.-5-
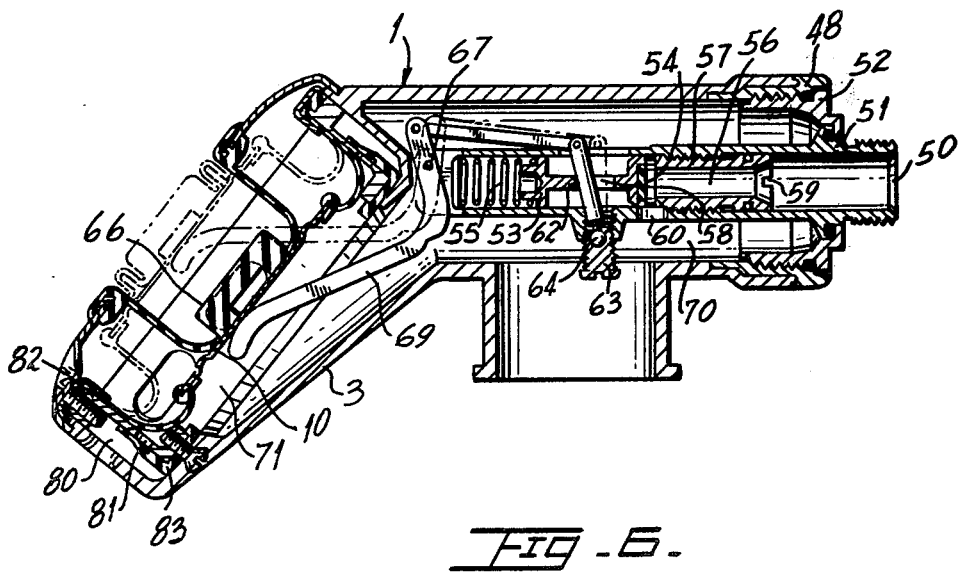
FIG.-6-

PRESSURE REGULATOR

BACKGROUND OF THE INVENTION

1. Field of the Invention

The present invention relates to regulators for self-contained underwater breathing apparatus.

2. Description of the Prior Art

It is the purpose of the regulators for self-contained underwater berathing apparatus (scuba) to provide breathable gas tracking the diver's breathing demand cycle as faithfully as possible. In order to achieve this end, the regulator design must take into account a variety of factors, i.e., frictional forces, inertia, etc., that come into play when it is used.

Several attempts have been made in the past to provide a regulator that responds accurately to the diver's breathing demand without causing him to be fatigued. One of these attempts is described in U.S. Pat. No. 3,783,891 issued to Christianson (Balanced Regulator Second Stage). Christianson's device is considerably more complicated, and, consequently, less reliable. It uses a pneumatic amplifier to sense and amplify the deflections produced on the diaphragm by the diver's suction from the mouthpiece. His regulator comprises, among other things, a pilot valve and a primary valve, the first one being activated directly by a linkage connected to the diaphragm. The present invention, on the other hand, does not require a dual valve system and it is considerably simpler. Furthermore, as described below, a number of adjustments can be readily made changing the sensitivity of the mechanism to the deflections of the diaphragm, thereby producing a closer tracking of the diver's breathing demand cycle.

None of the other regulators available in the market at the present time use the improvements described below. A search in the U.S. Patent and Trademark Office was conducted and the following patents were studied: U.S. Pat. Nos. 3,825,029; 3,818,921; 3,774,628; 3,698,425; 3,101,732 and 4,015,630, among others. None of these patents anticipate the present invention.

BRIEF SUMMARY OF THE INVENTION

It is the purpose of the present invention to provide a pressure regulator for self-contained underwater breathing apparatus wherein the sensitivity of the diaphragm may be readily adjusted using a common tool.

Another object of this invention is to provide a selected angle for the housing of the diaphragm relative to the main housing of the second stage of the regulator.

Still another important object of the present invention is to provide easy external adjustment means for varying the location of the piston's seat in the first stage of the pressure regulator relative to the piston, thereby varying the input pressure to the second stage.

Yet another object of this invention is to provide an improvement for the exhausting mechanism that will allow the diver to expel extraneous fluids from his pressure regulator.

The invention also comprises such other objects, advantages and capabilities as will later more fully appear and which are inherently possessed by the invention.

DESCRIPTION OF THE DRAWINGS

FIG. 1 shows the second stage of a pressure regulator, in perspective.

FIG. 2 illustrates the second stage of a regulator, like the one shown in FIG. 1, connected through a hose to the first stage, which is attached to a tank filled with breathable gas.

FIG. 3 is a cross-section of the first stage of the regulator where the seat of the piston is screwed in completely showing the minimum relative separation between the piston and its seat.

FIG. 4 is similar to FIG. 3, except that the piston's seat is out and farther away from the piston.

FIG. 5 is a cross-section of the second stage of the regulator showing the linkage ratio adjustment screw completely in and, consequently, producing the maximum torque and highest sensitivity of the diaphragm.

FIG. 6 is a cross-section similar to the one shown in FIG. 5, with the exception that the linkage ratio adjustment screw is all the way out thereby providing the minimum torque and lowest sensitivity of the diaphragm.

DETAILED DESCRIPTION OF THE PREFERRED EMBODIMENT

FIG. 1 shows the second stage of a pressure regulator 1. A mouthpiece 2 is attached to the cylindrical portion of the housing 3. The housing 3 has a cylindrical shape on one end and a round portion on the other end which houses the diaphragm 10. The cylindrical portion terminates with the hose connecting means 4 which is connected to a hose 5.

FIG. 2 shows the second stage 1 connected to the first stage 20 which in turn is connected to the tank 30.

FIG. 3 shows a cross-section of the first stage 20 of an underwater pressure regulator. A knob 25 has a shank 21 which extends transversely through a yoke 24. The knob 25 is used to attach the first stage 20 of the regulator to the tank 30. Passage means 26 connects the high pressure inlet 22 to the high pressure chamber 23. Extending into the high pressure chamber 23 is the open end 45 of a reciprocally movable piston 28. The open end 45 is adapted to seal against a piston seat 29 when the first stage piston 28 is in closed position. Piston 28 is provided with a longitudinal passage 31 which opens into a low pressure chamber 32. The longitudinal passage 31 connects the high pressure chamber 23 to the low pressure chamber 32 when the open end of the piston 45 is away from its seat 29. An ambient pressure chamber 34 is positioned between the high pressure chamber 23 and the low pressure chamber 32. One or more ambient pressure ports 35 extend through the wall of the first stage housing 40 to connect ambient pressure chamber 34 to ambient pressure. A coil spring 18 is positioned within the ambient pressure chamber 34. One end of the coil spring 18 is placed inside the first stage housing 40. The other end of the coil spring 18 bears against the piston base 36 and normally urges the piston away from its seat 29, as shown in the drawings. The low pressure chamber 32 is connected to low pressure outlet 19 which in turn is connected to the hose 5.

One of the most important improvements of the present invention, in contrast with regulators of the prior art, is the relative ease for changing the output pressure from the first stage (or input pressure to the second stage) by using a common tool. In FIG. 3, a slot 44 is represented to accomplish this, but other means may be used. A seat assembly composed of a seat retainer 43, a piston seat 29 and a seat adjustment housing 42 causes the relative position of the seat 29 to change with respect to the piston's open end 45. Seat retainer 43 has an annular shape and surrounds the piston's seat 29 around its lateral periphery and engages the end of the seat 29 that faces the piston 28 against a recess built in said seat retainer's 43 inside cylindrical wall. The outside mostly cylindrical wall of said seat retainer 43 has a threaded engagement 46. The reason for this seat retainer adjustment seat housing threaded interface is to allow the introduction and positioning of the piston's seat 29 which, had there been only one piece formed, would not have been possible. Seat adjustment housing 42 is also of substantially cylindrical shape and provides support for the piston's seat 29 other end (the one that is not facing the piston's open end). The seat adjustment housing 42 has a slot 44 that permits its rotation. The piston's seat 29 fits tightly between the seat retainer 43 and the seat adjustment housing 42. Finally, the limit ring 41, having a substantially cylindrical shape, engages both the seat adjustment housing 42 and the first stage housing 40 by threaded means on its inner and outer cylindrical walls, respectively. Limit ring 41 has a plurality of pin holes 47, as shown in the preferred embodiment's FIGS. 3 and 4, or slots or any other means for rotating said limit ring 41.

Referring now to FIGS. 5 and 6, where we have a cross-section of the regulator's second stage, it may be observed that the mouthpiece 2 shown in FIG. 1 and the hose 5 connection have been eliminated in order to simplify the drawing. The air or gas is fed to the second stage through the second stage inlet orifice 50 which is formed by valve housing 51. The air inlet end of the second stage housing 3 is tubular in form, and has the valve housing 51 concentrically supported therein by means of an externally-threaded housing retainer 52 threadingly received within an internally-threaded insert 48 press-fitted within the air inlet end of said second stage regulator housing. The insert 48 has a central opening through which an outer, threaded end portion of the valve housing 51 extends. The hose connecting means 4 (see FIG. 1) is screw-threaded on the outwardly-projecting end of valve housing 51, and serves to clamp said valve housing in place against an internal, peripheral shoulder integrally formed on said valve housing. The main purpose of insert 51 is to tighten retainer 52 more. The valve housing 51 encloses a slidable second stage valve piston 53, having a spring 55 attached to one end of said valve piston 53 and the other end having a closing seat 54 which seals the inner passage 56 of hollow cylinder 57. The valve piston 53 has a hole 58 pierced by pin 61 and the inner wall of this valve piston hole 58 closest to spring 55 has a protrusion referred to as contact point protrusion 62. The hollow cylinder 57 has threaded engagement with valve housing 51 and its relative linear position may be changed by rotating it. The preferred embodiment shows hollow cylinder's slot 59 but other means may be used. An aspirator opening 60 on the valve housing 51 is located in the neighborhood of the interface between the closing seat 54 and the corresponding end of the hollow cylinder 57. Hollow cylinder 57 may be rotated and its linear position relative to the valve housing 51 changed. The ability of moving hollow cylinder 57 linearly inside said valve housing 51 allows the lever 69 to be placed in a pre-determined position where it will be in contact with diaphragm 10, by virtue of the connection with rod 65 and pin 61. Also, this movement of hollow cylinder 57 allows the easy insertion of spring 55 and second stage valve piston 53 when said hollow cylinder 57 is removed. As shown in FIG. 6, separating closing seat 54 from hollow cylinder 57 then allows low pressure through aspirator opening 60 by rod 65 which in turn is connected to lever 69. S-shaped lever 69 pivots around first fulcrum point 67 which allows it to sense the movements of diaphragm 10 with the lever's end that is not connected to rod 65.

Diaphragm 10 moves in response to two forces. First, if manual purge button 66 is directly actuated, the diaphragm 10 will move since it is adjacent to it, as shown in FIG. 6. Secondly, when the diver inhales through mouthpiece 2, a partial vacuum is created inside the outlet chamber 70 thereby urging the diaphragm 10 in by virtue of the pressure differential with respect to the external ambient pressure. When the diaphragm 10 moves in response to diver's inhalation, the purge button 66 will remain in place, as shown by the phantom lines in FIG. 6. This second way of imparting a movement of diaphragm 10 is most important because the user may get fatigued if he needs to create a very low pressure (partial vacuum) inside the outlet chamber 70 and diaphragm chamber 71 using his lungs. Diaphragm chamber 71 is actually part of outlet chamber 70 and both have the same pressure. On the other hand, if the diaphragm 10 is too sensitive, a substantial waste of air may be the result. Somewhere inbetween these two extremes, a design compromise is reached. This compromise, however, may change with time (aging of the equipment), or just preferences of the individual diver. The present invention allows for an adjustment of the sensitivity of the diaphragm 10 as well as the output pressure of the first stage to the second stage, thereby providing a perfect match between the diver and his regulator.

The adjustment of the sensitivity of the diaphragm 10 will be explained now. To start, a qualitative description of the mechanism will expose the fixed and variable factors affecting the diaphragm's sensitivity. When diaphragm 10 moves, a force is transmitted to one end of lever 69, referred to as $F_d$, which is multiplied by its corresponding force arm or moment of force, thereby producing torque $T_p$. The other end of lever 69 is connected to rod 65 at a distance away from second stage fulcrum point 67 thereby providing a force that will be transmitted to pin 61, urging the last one towards lever 69. The force applied to pin 61, called $F_p$, will be the force $F_d$ amplified by a factor equal to the quotient of the moment of force for $F_d$, called $X_d$, divided by the moment of force for $F_p$, or $X_p$. This quotient will be greater than one and, consequently, $F_d$ will be amplified and become $F_p$. $F_p$ then will be transmitted through rod 65 to pin 61. Pin 61 pivots around ball-point 64 producing a torque, $T_p$, which is the product of $F_p$ times the length of the pin 61, or $Y_p$. The torque balancing $T_p$ will be the distance from ball-point 64 to contact point 62, which will be referred to as $Y_s$, multiplied by the force $F_s$ applied to contact point protrusion 62. Ratio adjustment screw 63 may be screwed in or out thereby changing $Y_s$ and, as a result, the torque $T_s$, computed by multiplying $Y_s$ times $F_s$, which is the force applied to contact point 62, is varied. $F_s$ then will be smallest when adjustment screw 63 is all the way out and largest when it is completely in. It is $F_s$ that offsets the spring force, F spring, which is equal to a constant of elasticity K times the compressed distance, $dX_s$. When valve piston 53 moves to the left in FIG. 6, the aspirator opening 60 is cleared proportionally thereby allowing the air at low pressure (higher than ambient and lower than the tank's pressure) to penetrate outlet chamber 70. When the air rushes in towards the mouthpiece 2 to occupy the partial vacuum created by the diver, a lower pressure is created to the left of the mouthpiece 2 by virtue of Bernoulli's principle. The opening between diaphragm chamber 71 and outlet chamber 70 will act as a "venturi". The creation of a low pressure by the movement of a stream of gas will in general provide a positive feedback to the entire system, further urging the diaphragm 10 towards inside its chamber 71.

Since the selection of the angles affects the overall performance of the mechanism, a brief mathematical description follows:
Where, $F_d$ = Force produced by diaphragm
$F_{dx}$ = $F_d$'s component along "X" axis
$F_{dy}$ = $F_d$'s component perpendicular to "X" axis
$F_p$ = Force transmitted to pin
$F_{px}$ = $F_p$'s component along "X" axis
$F_{py}$ = $F_p$'s component perpendicular to "X" axis The "X" axis is defined by the first fulcrum point 11 and the point of intersection of the line of action of $F_p$ and the lever.

In Equilibrium (1) $F_x = 0$; $F_{dx} + F_{px} = 0$; $F_{dx} = -F_{px}$
(2) $F_y = 0$; $F_{dy} = F_{py} = 0$; $F_{dy} = -F_{py}$
(3) $F_i \cdot X_i = 0$; $F_{dy} \cdot X_d = F_{py} \cdot X_p = 0$
(4) Cos A = $F_{dy}/F_d$; $F_{dy} = F_d$ Cos A where A is the acute angle formed between the plane of the diaphragm and a line parallel to the "X" axis.
(5) Cos B = $F_{py}/F_p$; $F_{py} = F_p$ Cos B where B is the angle between a line perpendicular to the lever and the axis of the rod 65. However, B; 0 and for all practical purposes and B = 1.
(6) Now, the second amplification involves the pin and the adjustment screw.

Where, $F_s$ = Force applied to compress the spring
$D_p$ = Movement of $F_p$ substantially the length of the pin.
$D_s$ = Moment of $F_s$, basically the distance between ball-point and contact point.

Then, (7) $F_p \cdot D_p = F_s \cdot D_s$

Also, where:

K = Elasticity (compression) constant of the spring.
$X_s$ = Displacement (compression) of the spring.
$F_s + K \cdot dX_s$ Subst. (8) in (6): $F_d = K \cdot X_p / X^d \cdot 1/\text{Cos A} \cdot D_s / D_p \cdot dX_s$ FIGS. 5 and 6 also show an exhaust valve system 80 which consists of a plurality of exhaust ports 81 located around the periphery of diaphragm support housing 82 and flexible jacket 83 covering said exhaust ports 81. Any extraneous fluid trapped inside the outlet chamber 70 or the diaphragm chamber 71 may be expelled by the user by blowing it out through the exhaust ports 81. The exhaust valve system 80 is a one-way valve. The positioning of the exhaust ports 81 around the periphery of the diaphragm chamber 71 allows the diver to expel any extraneous fluid, with a minimum of effort, from any position.

Finally, a plurality of rubber O-rings 49 are shown in FIGS. 3, 4, 5 and 6 and its use being well known in the trade to provide a seal for the interface of two metal parts.

It is believed the foregoing description conveys the best understanding of the objects and advantages of the present invention. Different embodiments may be made of the invention herein described without departing from the inventive concept of the present invention. It is to be understood that all matter disclosed herein is to be interpreted merely as illustrative, and not in a limiting sense, except as set forth in the following appended claims.

Having thus set forth the nature of this invention, what is claimed is:

1. An improved underwater diving regulator comprising:
   (a) a first stage regulator receiving breathable gas from a supply tank,
   (b) a flexible conduit connected on one end to said first stage regulator,
   (c) a second stage regulator having a mouthpiece and being connected to the other end of said flexible conduit providing said breathable gas to a diver via said mouthpiece in response to inhalation demand and further comprising a second stage housing including an inlet chamber to which said flexible conduit is connected and an outlet chamber communicating, with said mouthpiece, diaphragm means in said outlet chamber and responsive to the pressure therein for sensing said inhalation demand, said second stage housing comprising an internal cylindrical valve housing, said cylindrical valve housing having a threaded orifice in its peripheral side-wall and an adjustment screw threadingly engaged in said threaded orifice and an aspirator opening through the wall of said cylindrical valve housing communicating with said outlet chamber, a lever pivotally connected with respect to said second stage valve housing and having one end of said lever in contact with said diaphragm means for sensing its movement, a rod having one end connected to the other end of said lever for transmitting said movements of the diaphragm, a pin having one end connected to the other end of said rod said cylindrical valve housing having an elongated side-wall opening directly opposite said adjustment screw, a piston member slidingly received within said cylindrical valve housing and having a piston plunger at one end and a piston closing head at the other end, a hollow cylinder screwed inside of said cylindrical valve housing and having a valve seat at its inner end against which said piston closing head is seatable said piston member having a transverse opening intermediate its ends adjacent said elongated side-wall opening and said adjustment screw, compression spring means yieldingly constraining said closing head end of said piston member in seating engagement with the valve seat of said hollow cylinder, said pin extending through said elongated side-wall opening in said cylindrical valve housing, through said transverse opening in said piston member and hinged at its other end to the inner tip of said adjustment screw for amplifying the force transmitted from said rod to said piston member.

2. An improved underwater diving regulator as described in claim 1 wherein said diaphragm means in said outlet chamber is enclosed in a cylindrical diaphragm support housing having a plurality of exhaust ports around its periphery for purging out extraneous fluids trapped inside said outlet chamber, said exhaust ports being covered at the outside of said cylindrical diaphragm support housing by a flexible cylindrical jacket, portions of said jacket being seated against the outsides of said exhaust ports and operating as a one-way valve.

3. An improved underwater diving regulator as described in claim 1 wherein said pin in said second stage regulator has a ball termination embracingly received within a spherical recess in the tip of said adjustment screw, thereby providing a good grip and a smooth hinge mechanism.

* * * * *